Patented Jan. 23, 1945

2,367,661

UNITED STATES PATENT OFFICE 2,367,661

PROCESS OF PHOTOPOLYMERIZATION

Courtland L. Agre, Minneapolis, Minn., assignor to E. I. du Pont de Nemours & Company, Wilmington, Del., a corporation of Delaware No Drawing. Application December 31, 1941, Serial No. 425,202

20 Claims. (Cl. 204—158)

This invention relates to the polymerization of polymerizable organic compounds under the influence of light.

Although the polymerization of polymerizable ethylenic compounds by the catalytic action of light has been known for a long time, no known practical application of this process has been made. This is probably due in part to the slow rate of photopolymerization compared with present commercial processes of polymerization.

This invention has as an object the provision of a process whereby the light polymerization of polymerizable organic compounds could be effected at a practicable rate. Other objects will appear hereinafter.

These objects are accomplished by the following invention wherein the polymerization of an unsaturated compound having at least one ethylenic double bond which polymerizes either alone or in the presence of another polymerizable unsaturated compound is effected under the influence of light and an alpha-carbonyl alcohol of the formula R—CO—CHOH—R', wherein R and R' are the same or different and are hydrogen atoms or monovalent hydrocarbon radicals. A subclass falling under this general classification is the acyloins which are organic compounds of the above type where R and R' are aliphatic or aromatic and which are generally formed from two molecules of an aldehyde by interreaction of the aldehyde groups.

The polymerization can be carried out by any of the well-known processes, such as bulk, emulsion, granular, and solution polymerization processes. In all of these processes, the addition of an acyloin to samples subjected to the action of light greatly increases the rate of polymerization. Since the mechanical means of carrying out the invention vary with the systems employed, the individual processes are discussed briefly below.

In bulk polymerization a relatively small amount of an acyloin (about 0.1%) based on the total content of polymerizable material is dissolved in a chosen monomer and the solution is placed in a suitable vessel. The vessel can be constructed of glass so that the light can enter the system through the sides of the vessel, or there can be a source of light within the vessel, which source of light may be a mercury vapor lamp or a tungsten bulb or some similar arrangement to give light either in the range of the ultraviolet plus visible light, or in the range of visible light alone. Polymerization occurs fairly rapidly under relatively mild conditions of temperature and the rate is dependent on the temperature in the system and on the intensity of the light. In order to obtain sheets and castings free from defects, it is desirable to control the temperature so that local over-heating does not occur. The extent of polymerization can be determined by measuring the refractive index or by gravimetric methods involving separation of the polymeric product. By application of this polymerization process, bulk castings free from surface defects can be obtained in a relatively short period of time.

In emulsion polymerization the monomer and the acyloin are held in emulsion in water by an emulsifying agent. The emulsion is then exposed to light passing through the side of the vessel or by some other suitable method until polymerization has proceeded to the desired extent. Still more rapid polymerization occurs if a peroxide, such as hydrogen peroxide, is present in the emulsion together with the acyloin. The polymer is then precipitated from the emulsion, after the removal of residual monomer, by the addition of a small amount of an electrolyte or by freezing. The product is then thoroughly washed and dried in the usual manner.

In the granular polymerization process, the monomer containing a small amount of an acyloin as the photopolymerization catalyst is rapidly agitated in an aqueous system containing a small percentage (up to about 3%), based on the monomer, of a protective colloid, which acts as the granulating agent, in a vessel equipped with a reflux condenser at such a temperature that moderate reflux is maintained. Under these conditions the monomer is dispersed in the form of small droplets which solidify as polymerization proceeds to give a polymer in the form of small granules. The granules are readily filtered from the mixture, washed free from occluded colloid, and dried.

The process of this invention can also be carried out in solution. The monomer and acyloin are dissolved in a solvent and light is directed upon the solution until the desired extent of polymerization is achieved.

The more detailed practice of the invention is illustrated by the following examples, wherein parts given are by weight and the reaction vessels were of "Pyrex" glass unless otherwise noted. There are of course many forms of the invention other than these specific embodiments.

*Example I*

Methyl methacrylate containing about 0.1% acyloin in a "Pyrex" glass vessel placed about 12 inches from the light source was exposed at about 40° C. to the influence of the light from a 6 inch mercury vapor arc operating at about 150 volts and 4.5 amperes.

The table below indicates the time of exposure to the light required for solidification (formation of about 30% polymer) of the monomer containing the named acyloin.

| Acyloin | Time |
|---|---|
| | Hours |
| None (control) | 8 |
| Benzoin | 1.7 |
| 3-hydroxy-4-methylpentanone-2 | 2 |
| Butyroin | 4 |
| Tert. butylbenzoin | 2.5 |
| Toluoin | 2.5 |
| Tert. butyltoluoin | 2.5 |
| 11-hydroxy-12-ketotetracosane | 5 |
| Glycolic aldehyde | 4.5 |
| Acetoin | 4 |

*Example II*

This example illustrates the effect of the concentration of the acyloin on the rate of photopolymerization of methyl methacrylate in bulk at 40° C.

The indicated amount of benzoin was dissolved in pure monomeric methyl methacrylate and the solution placed in a "Pyrex" glass vessel. The sample was then irradiated with light from a mercury vapor arc as in Example I, and the extent of polymerization measured by means of the refractive index as polymerization proceeded. The following table indicates the time required to effect 5% polymerization of methyl methacrylate monomer in the presence of the designated amount of acyloin.

| Percent acyloin (benzoin) | Time for 5% polymerization |
|---|---|
| | Minutes |
| 1.0 | 6 |
| 0.1 | 10 |
| 0.01 | 57 |
| 0.001 | 110 |
| None | 157 |

*Example III*

This example illustrates the effect of oxygen in the atmosphere wherein the photopolymerization is effected.

Samples of methyl methacrylate containing 0.2% of benzoin as the photopolymerization catalyst were placed in closed "Pyrex" vessels containing the gases indicated in the accompanying table. The specimens were then subjected to the irradiation of a mercury vapor arc as in Example I for 40 minutes and the quantities of polymer formed determined by isolating and weighing the polymers.

| Atmosphere | Percent polymer |
|---|---|
| 1.0 atm. of air | 25.4 |
| Evacuated (about 10⁻³ mm. of mercury) | 31.0 |
| 1 atm. nitrogen | 31.6 |
| 0.01 atm. oxygen | 27.5 |
| 0.1 atm. oxygen | 22.7 |
| 1.0 atm. oxygen | 1.5 |

The above table indicates that, while air is a satisfactory atmosphere for the photopolymerization of methyl methacrylate, reduction of the amount of oxygen is beneficial, and photopolymerization in an atmosphere of oxygen is undesirable.

*Example IV*

The previous examples have illustrated the photopolymerization of methyl methacrylate in the presence of acyloin photopolymerization catalysts under various conditions. The present example illustrates the effect of one acyloin, benzoin, on various monomers. The time element represents the period required for photopolymerization of the listed monomer to a solid and in each instance is compared with time for polymerization of the control having no photopolymerization catalyst present.

The monomer was placed in a "Pyrex" glass tube (which transmits light of greater than 2850 A.) and 0.1% of benzoin was added. The solution was then exposed at 40° C. to the light from a mercury vapor arc as in Example I until the material had become solid. In each instance a control without benzoin was irradiated simultaneously.

| Monomer | Time for control in hours | Time with 0.1% benzoin in hours |
|---|---|---|
| Isopropyl methacrylate | 6.5 | 1.5 |
| n-Butyl methacrylate | >10 | 1.5 |
| Vinyl formate | 6 | 0.5 |
| Dichloroethylene (asymmetrical) | 1.0 | 0.5 |
| Styrene | 30 | 15 |
| Vinyl acetate | 20 | 1.5 |
| Divinyl formal | >10 | 5.0 |
| Methyl alpha-chloroacrylate | 2.6 | <0.5 |
| Beta-dimethylaminoethyl methacrylate | 5 | 2 |
| Divinyl butyral | >24 | 12 |
| Divinyl ether | 3.0 | 0.75 |
| Vinyl chloride | 3 | 0.25 |
| Acrolein | 72 | 24 |
| Acrylonitrile | 4.5 | 1.0 |
| 2-nitropropyl methacrylate | 3 | 0.5 |
| Methylene diethylmalonate | 4.5 | 0.5 |
| Methyl vinyl ketone | >5 | 2.5 |
| N-methyl methacrylamide | 3 | 0.75 |

(> means greater than; < means less than.)

*Example V*

This example illustrates the preparation of sheet castings by the process of this invention.

A solution of about 0.1% benzoin in methyl methacrylate monomer contained in a "Pyrex" glass reaction vessel was irradiated by means of a light source as in Example I until a thin syrup had formed. This syrup was then poured between two sheets of glass plate separated by a flexible separator. This plate system was then supported on a ground glass plate mounted at an angle of about 5° from the horizontal, and pressure was uniformly applied on the plates. Irradiation was provided from below by means of a mercury vapor lamp (a Westinghouse H-3 lamp modified by mounting the bulb in a 20 mm. quartz tube) at a distance of about 10 to 12 inches and was continued at about room temperature until polymerization was practically complete. When the retaining glass plates were removed by soaking for a short time in warm water, there was obtained a cast sheet of polymer which was free from visible defects such as bubbles, striations and lack of clarity.

*Example VI*

This example illustrates the preparation of large bulk castings by the process of this invention.

A solution of methyl methacrylate containing about 0.1% of benzoin was placed in a suitable glass container mounted in a fluid to provide a means of controlling the temperature of polymerization. Light from a modified Westinghouse mercury vapor lamp as in Example V placed at a distance of about 7 to 8 inches was passed through the bottom of the container until polymerization appeared to be practically complete. The bulk casting was then baked several hours at about 75° C. to insure complete polymerization. The product thus obtained was colorless and free from visible defects such as bubbles, striations and the like.

Example VII

This example illustrates the photointerpolymerization of vinyl acetate and a resin containing ethylenic bonds.

A mixture of 25 parts vinyl acetate and 75 parts of a diethylene glycol-maleic anhydride condensation product having an acid number of about 10 was divided into two parts, and in one part was dissolved about one per cent of benzoin based on total weight of the mixture. The two portions were then irradiated by means of a mercury vapor arc as in Example I, at a distance of about 10 to 12 inches, and the time of polymerization was determined. The sample which contained benzoin was completely solidified within 45 minutes, whereas the sample containing no benzoin had undergone practically no polymerization.

Example VIII

This example illustrates the use of acyloins in emulsion photopolymerization and the effect of both acyloin and a peroxide.

Twenty parts of an emulsion prepared from 140 parts of monomeric methyl methacrylate, 260 parts of distilled water, and 8 parts of an emulsifying agent (the sodium salt of the sulfate of oleyl alcohol) was added to each of a series of glass vessels. To certain of these 0.035 part of benzoin was added, to others 0.113 part of 33% hydrogen peroxide, while to others either both or none of these two materials was added. This is indicated in the following table. Certain of the vessels were exposed at 35° C. to the irradiation of a mercury vapor arc as in Example I, at a distance of about 10 to 12 inches, while others were kept in the dark at the same temperature. At the end of 80 minutes all the emulsions were broken by the addition of an electrolyte (aluminum sulfate) and the polymers isolated, dried, and weighed.

The following table contains the data thus obtained, and shows the beneficial effect of benzoin and of the combination of benzoin and hydrogen peroxide.

| Light | Added material A | Added material B | Polymer yield, percent |
|---|---|---|---|
| UV light | None | None | 18.2 |
| Do | Benzoin | do | 79.4 |
| None | do | do | 0.0 |
| UV light | None | Hydrogen peroxide | 37.0 |
| None | do | do | 0.0 |
| UV light | Benzoin | do | 97.0 |
| None | do | do | 0.0 |

Example IX

This example illustrates the beneficial effect of benzoin on the photopolymerization of methyl methacrylate in solution.

A solution of 100 parts of methyl methacrylate in 200 parts of acetone was divided into two parts, and to one was added 0.1 part of benzoin (based on the monomer). The two solutions were then simultaneously exposed in "Pyrex" vessels to the light from a mercury vapor arc as in Example I, at a distance of about 10 to 12 inches. After irradiation for six hours, the polymers were precipitated from the solution. The following yields were obtained: polymerization with benzoin—50.5%; polymerization without benzoin—30.8%.

Example X

This illustrates the effect of an acyloin in granular type photopolymerization.

A system for the granular polymerization of butyl methacrylate was prepared from 200 parts of water, 1 part of methylstarch (granulating agent), 75 parts of butyl methacrylate, and 0.75 part of benzoin. These materials were placed in a glass vessel and were irradiated by means of a mercury vapor arc as in Example I, at a distance of 6 to 8 inches. The material was stirred vigorously, and polymerization proceeded at reflux temperature. Within 15 minutes polymerization was practically complete. The granular product was washed well and dried, and gave an almost quantitative yield of polymer. Under very similar conditions, except that benzoyl peroxide was employed in place of benzoin, the polymerization required about 1.5 hours for completion.

Example XI

This example illustrates the granular photointerpolymerization of methyl methacrylate and vinyl acetate.

The system for granular polymerization was prepared from 30 parts of monomeric vinyl acetate, 70 parts of monomeric methyl methacrylate, 1 part of benzoin, 200 parts of distilled water, and 1.5 parts of methyl starch as the granulating agent. These materials were placed in a glass vessel irradiated by means of a mercury vapor arc as in Example I, at a distance of about 6 to 8 inches. Polymerization under continuous agitation then was effected at reflux temperatures and was complete within 3.5 hours. The product thus obtained was in the form of granules, and was obtained in almost quantitative yield. The product can be molded into a homogeneous, clear chip, which softened at about 103° C. Products of this type prepared by other methods usually yield moldings which are opaque because of their non-homogeneity.

Example XII

The following example illustrates the granular polymerization of styrene under the influence of light using both an acyloin and a peroxide.

Two hundred parts of water, 1.5 parts of methyl starch, 100 parts of styrene, 1.0 part of benzoin, and 1.0 part of benzoyl peroxide were exposed in a glass vessel to the influence of irradiation from a mercury vapor arc as in Example I, at a distance of 6 to 8 inches. In 2.5 hours polymerization was complete, whereas without benzoin it proceeded to only a very slight extent within this period of time. The product was obtained in the form of fine, uniform granules, and could be molded into a practically colorless chip.

Example XIII

This example illustrates the use of sunlight as the source of energy in the process of this invention.

Three thousand grams of methyl methacrylate, 3.0 grams of benzoin, and 4.2 grams of lauroyl peroxide were placed in a glass vessel and were irradiated for 2 hours with a Westinghouse H-3 mercury vapor lamp. The product at the end of this period was a viscous syrup having a viscosity of 27 poises and a polymer content of 17.3%.

Two hundred grams of this syrup was poured into a cell which consisted of 2 sheets of plate glass separated by a flexible "Thiokol" gasket and the syrup was then exposed to sunlight for 2 hours, and finally was heated in an oven at 100° C. for 2 hours. The resulting sheet was clear, transparent, tough, and free from bubbles.

Example XIV

This example shows the use of tungsten light as a source of energy.

Two hundred grams of the methyl methacrylate syrup containing 17.3% polymer as prepared in the previous example was poured into a cell which consisted of two sheets of plate glass separated by a flexible "Thiokol" gasket. The polymer mixture was then irradiated for 3 hours with a General Electric Mazda PS-52, 1500 watt, 110 volt bulb at a distance of 2 feet. Following the light treatment the polymerization mixture was heated in an oven at 100° C. for 2 hours. The resultant sheet was comparable to polymethyl methacrylate sheets made by the usual heat polymerization method.

Example XV

This method not only applies to the quick repairing of bullet holes in bomber turrets but also to the filling of bubble holes and other imperfections in practically any object to which the filling material will adhere. This method involves filling the hole with a stiff dough containing an activator and then irradiating for a short time with ultraviolet light. After cleaning and polishing, it is only just possible to detect the repair unless held at a very critical angle to the light. A detailed description of the procedure is given below.

A stiff dough is made containing 60 g. of methyl methacrylate monomer, 40 g. of methyl methacrylate molding powder, 0.14 g. of lauroyl peroxide, and .1 g. of benzoin. The hole is then reamed out with a sharp-pointed knife and the dough then injected. The dough is then polymerized by irradiating for about ten minutes with an ultraviolet lamp. The filling is then polished, first with fine emery paper, next with crocus cloth, and finally with felt. The polishing is done with a very small compression air turbine motor which makes 25,000 R. P. M.

Another application of the process of this invention is the use of light and an acyloin in "drying" or polymerization of resinous materials. Example VII indicates the process whereby an unsaturated resin is polymerized together with vinyl acetate to give an interpolymer which is homogeneous. Furthermore, this same resin, a material formed by the condensation of diethylene glycol and maleic anhydride, when coated on glass and treated with light dries at an appreciably increased rate when an acyloin, e. g., benzoin, is present in the film.

The present invention is an improvement in photopolymerization, i. e., in polymerization influenced by radiant energy in the form of light rays, both visible and invisible. The term light as herein used includes wavelengths both in the infrared and in the ultraviolet and, of course, wavelengths of all light in the intermediate visible spectrum. Light waves in the infrared are operable in effecting photopolymerization of the compounds herein described in the presence of the designated photopolymerization catalysts but the rate of photopolymerization is slower than in visible or in ultraviolet light. Light in the ultraviolet region having wavelengths shorter than 3200 Angstroms and, for example, down to 1800 Angstroms which is the limit of transmission of quartz is operable in this process. The most useful and effective light is that having wavelengths between 3200 Angstroms and 7000 Angstroms. Although as pointed out above, wavelengths below 3200 Angstroms are effective, no difference in the rate of polymerization is noted when wavelengths of light of equal intensity and lower than 3200 Angstroms are prevented from reaching the photopolymerizable compound. Thirty-two hundred Angstroms is the lower limit of transmission of ordinary glass and since light passing through this material is frequently used in this process, this figure represents a lower preferred limit. The upper limit of 7000 Angstroms represents the beginning of the infrared band having the less effective wavelengths.

The wavelengths of light actually utilized in the photopolymerization process frequently depend on the opacity or transparency of the walls of the container holding the photopolymerizable compound. In general, light which contains wavelengths higher than those to which the transparent material is partially or completely opaque is necessary. For example, when ordinary glass is used as a container for the photopolymerizable material, and light is transmitted through the walls of the container, the light reaching the photopolymerization reaction mixture is largely that containing wavelengths greater than 3200 Angstroms. When tubes or vessels of Pyrex glass are employed to hold the photopolymerization reaction mixture, the lower limit of the light available is approximately 2850 Angstroms. The limit of actinic rays for methyl methacrylate itself is about 3500 Angstroms, so that in photopolymerizations using methyl methacrylate monomer, light having a wavelength greater than 3500 Angstroms should, in general, be available for the photopolymerization. In a polymerization of this type, the walls of the container are not always a limiting factor since it has been shown that X-rays of wavelengths of 0.7 Angstrom are also effective for causing polymerization.

It is advantageous to use such a system that a controlled amount of light comes into contact with the material to be photopolymerized. The rate of the photopolymerization varies directly with the intensity of the light and can usually be increased or diminished by increasing or diminishing the intensity of the light that reaches the reaction mixture. A convenient source of light of proper intensity is the mercury vapor arc which emits light in the ultraviolet as well as in the visible range. Another convenient source of light is a tungsten bulb of suitable intensity, for example, a General Electric Mazda PS-52, 1500 watt, 110 volts, will function effectively. Sunlight is another source of effective light for carrying out the photopolymerization in the presence of the photopolymerization catalysts. Diffused daylight contains wavelengths of light which are active for the catalyzed photopolymerization but the reaction is considerably slower than with other more intense sources of light.

The type of container used for the polymerization depends upon the results desired. For instance, in the bulk polymerization of a monomer to form sheeting, it is desirable to have absolutely smooth surfaces, and, consequently, glass plates ordinarily are used. In small scale polymerizations employing granulation and emulsion systems, "Pyrex" glass containers may be employed. However, where the scale employed in industrial application is such that containers are not available in sufficiently large size, it is necessary to use metallic or other containers with the light above or within the material to be polymerized.

The temperature of polymerization is dependent on the monomer being polymerized and the type of process employed, and need not be essentially different from the temperatures hitherto employed. The usual range is from room temperature to about 100° C. In the bulk polymerization of a material such as methyl methacrylate it is necessary to keep the temperature fairly constant at some temperature within the range of 25 to 85° C. in order to control the polymerization and avoid the occurrence of bubbles, striations and similar defects. The molecular weight is somewhat dependent upon the temperature of polymerization, as well as on other factors, and this element, therefore, enters into the determination of operating conditions. Granular polymerization ordinarily is carried out at reflux temperature; emulsion polymerization is usually carried out at 25 to 85° C. Temperatures above 100° C. can frequently be advantageously employed in apparatus designed to withstand the operating pressure.

The concentration of photopolymerization catalyst in the solution is of importance because it appreciably affects the rate of polymerization, as shown in Example II. From 0.01% to 1.0% or even more of photopolymerization catalyst, based on the weight of photopolymerizable compound may be employed. From 0.05% to 0.2% of catalyst is preferred. Usually about 0.1% by weight of an acyloin based on polymerizable material is employed, although either more or less can be used depending upon the nature of the product being prepared and on the rate of polymerization desired. As illustrated by Example 2, if too little polymerization catalyst is used the reaction goes too slow, whereas if more than the preferred amount is used discoloration is apt to occur. Furthermore, the acyloin need not be employed alone for the polymerization of readily polymerizable materials, but can be used in conjunction with a peroxide. Thus, in bulk polymerization, the presence of both benzoyl peroxide and an acyloin causes slightly more rapid polymerization than in the instances in which the acyloin is present alone. Furthermore, in a system of this type, a monomer which is only partially polymerized when irradiation is discontinued will continue to polymerize at a fairly rapid rate at elevated temperatures. Benzoyl peroxide, hydrogen peroxide, and similar peroxides can be used in conjunction with an acyloin and light. The molecular weight is appreciably dependent on the concentration of the acyloin in the system.

The nature of the gaseous atmosphere above the sample in the vessel is of importance. Example III indicates that an atmosphere of oxygen practically stops polymerization, whereas an atmosphere of nitrogen gives the greatest amount of polymerization within a definite period of time. Consequently, although air itself is usually employed as the atmosphere above the sample and ordinarily is quite satisfactory, the polymerization will proceed at an even greater rate when the air is at least partially removed or replaced by an inert gas.

In the process of this invention, any alpha-carbonyl alcohol represented by the formula

R—CO—CHOH—R' wherein R and R' are hydrogen or monovalent hydrocarbon radicals may be employed.

The preferred type of the alpha-carbonyl alcohols are the acyloins which are organic compounds of the above type where R and R' are aliphatic or aromatic and which may be prepared in a number of ways (Whitmore—Organic Chemistry, pp. 405–6) but are usually prepared from two molecules of an aldehyde by interreaction of the aldehyde groups. Illustrative compounds are glycolic aldehyde, 3-hydroxy-4-methyl-pentanone-2, 12-hydroxy-13-keto-tetracosane, and the following acyloins, benzoin, acetoin, butyroin, toluin, tertiary butyl benzoin, and ortho and para-tertiary butyl toluin. Those acyloins wherein R and R' are aromatic hydrocarbon radicals are the most desirable acyloins for use in this invention although those wherein R and R' may be substituted, e. g., by chlorine, sulfo, carboxyl, alkoxy, acylamino, acyloxy, etc. groups are equivalent and may be employed.

The polymerizable materials employed in this invention are those compounds having at least one ethylenic double bond and which polymerize under the influence of light at least in the presence of another polymerizable ethylenically unsaturated compound, i. e., either alone or together with such partner or partners. The invention is generic to these materials which include vinyl and vinylidene esters of organic and inorganic acids, e. g. vinyl chloride, acetate, chloroacetate, vinylidene chloride; vinyl ethers, e. g. divinyl ether; vinyl acetals, e. g. divinyl formal; vinyl ketones, e. g. methyl vinyl ketone; vinyl hydrocarbons, e. g. styrene; dienes, e. g. chloroprene and isoprene; chloroacrylic acid esters, e. g. methyl chloroacrylate; acrylo and methacrylonitriles, and amides, e. g. methacrylamide, acrylonitrile and methacrylonitrile. Particularly preferred are the alkyl and particularly the lower (1 to 4 carbon) alkyl esters of acrylic and methacrylic acids, i. e. wholly aliphatic monocarboxylic acids wherein the monovalent hydrocarbon radical of 2 to 3 carbons is attached to the carboxyl by a carbon in turn attached to another carbon by an ethylenic double bond, e. g. methyl acrylate, methyl methacrylate, and octyl methacrylate. The invention is applicable to mixtures, e. g. that of diethyl fumarate, which does not polymerize readily, with vinyl chloride, which polymerizes easily. Thus, the invention includes not only the polymerization of the single readily polymerizable ethylenic compound, but includes also the simultaneous polymerization of two or more of these materials. Unsaturated materials which do not polymerize under the action of light either alone or in the presence of other polymerizable unsaturated compounds are excluded from this invention.

In granular and emulsion systems it often is desirable to use both an acyloin and a peroxide for most advantageous results. Usually the polymerization with light and a peroxide occurs slowly, while the addition of a small amount of an acyloin to such a system greatly increases the polymerization rate. The peroxides which may be employed are those hitherto employed in the polymerization of unsaturated compounds, including benzoyl peroxide, acetyl benzoyl peroxide, dibutyryl peroxide, succinyl peroxide, lauroyl peroxide, and hydrogen peroxide.

In granular and emulsion systems it is occasionally desirable to control the pH values. Thus, in using a combination of light, acyloin, and hydrogen peroxide in the granular polymerization of vinyl acetate, it has been found desirable to control the pH at a fairly definite value of about 4.2; this can be done by the careful addition of sodium bicarbonate solution. In the emulsion polymerization of vinyl or vinylidene chloride alone or in mixtures with other monomers such as methyl methacrylate, styrene, diethyl fumarate, and similar materials, it frequently is desirable to operate at a pH of about 2.5. In these instances the original emulsifying systems are adjusted to this pH by the addition of an acid such as formic acid or other strong acids. These factors are dependent on the systems and monomers being polymerized.

Emulsifying or dispersing agents selected must be suitable for use in the medium employed. Dispersing agents which perform acceptably in acid media include salts of sulfonic and sulfuric esters of long chain compounds, such as the sodium salt of acetoxyoctadecanesulfuric acid. It is not intended to limit the scope of this invention to the application of any specific emulsifying agents. Furthermore, in the granular method of polymerization the protective colloids used as granulating agents can be any type of soluble starch, methylated starch, partially hydrolyzed polyvinyl acetate, the sodium salts of polymers or interpolymers containing acrylic or methacrylic acids, polymethacrylamide, sodium starch glycolate, sodium cellulose glycolate, and other similar granulating materials.

The nature of the products obtained by the practice of this invention is entirely dependent upon the materials which are polymerized, and, consequently, vary widely in their properties. Since the properties of the products obtained by the application of this invention are entirely analogous to similar products obtained by other processes of polymerization of the same materials, the products can be used in any way that the polymers regularly obtained are used in commerce. Potential uses are in molding compositions, in coating and impregnating agents for fabrics, paper, and leather, in adhesives, in safety glass interlayers, etc.

The process of this invention may also be used to adhere the surfaces of two objects at least one of which is transparent, by placing a small amount of an organic, ethylenically unsaturated, photopolymerizable material containing an acyloin between the surfaces and passing light of appropriate intensity through the transparent member.

By carrying out the polymerization of methyl methacrylate catalyzed with benzoin and ultraviolet light between two accurately ground negative lenses, it is possible to produce a homogeneous lens which conforms in every detail to the curvature of the negative. By using other complex optical pieces such as prisms, it is also possible to prepare the three or more surfaces which are exact counterparts of the negative. These optical parts have exactly the same surface as the mold in which the polymerization is conducted, show no internal strain, and hence have a marked advantage over the optical equipment prepared from polymethyl methacrylate by injection or compression molding. This process may be applied to the preparation of any type of intricate object provided a satisfactory negative mold can be prepared in which one or more of the surfaces is composed of a material which is transparent to ultra-violet light.

This invention is also applicable to the elimination of imperfections caused by cracks or bubbles in transparent polymerized vinyl or vinylidene compounds. For example, imperfections of this kind in polymerized methyl methacrylate can be eliminated by filling the cracks or bubbles with a partially polymerized methyl methacrylate in the form of a syrup containing benzoin and a peroxide catalyst and subjecting the filled portions to the light of a mercury vapor lamp.

The above description and examples are intended to be illustrative only. Any modification of or variation therefrom which conforms to the spirit of the invention is intended to be included within the scope of the claims.

What is claimed is:

1. Process for preparing polymers which comprises irradiating, with light of wavelength in the range of 1800 to 7000 Angstroms, a composition comprising an ethylenically unsaturated, organic compound photopolymerizable at least in the presence of another such compound and an alpha carbonyl alcohol of the formula

R—CO—CHOH—R' wherein R and R' are monovalent hydrocarbon radicals, the radiation being of sufficient intensity and employed for a time sufficient to produce substantial polymerization.

2. Process for preparing polymers which comprises irradiating, with light of wavelength in the range of 1800 to 7000 Angstroms, a composition comprising a member of the class consisting of photopolymerizable vinyl and vinylidene compounds, and from 0.01 to 1.0%, by weight thereof, of an acyloin of the formula R—CO—CHOH—R', wherein R and R' are monovalent hydrocarbon radicals, the radiation being of sufficient intensity and employed for a time sufficient to produce substantial polymerization.

3. Process for preparing polymers which comprises irradiating, with light of wavelength in the range of 1800 to 7000 Angstroms, a composition comprising a member of the class consisting of photopolymerizable vinyl and vinylidene compounds, and from 0.01 to 1.0%, by weight thereof, of an aromatic acyloin of the formula

R—CO—CHOH—R' wherein R and R' are monovalent hydrocarbon radicals, the radiation being of sufficient intensity and employed for a time sufficient to produce substantial polymerization.

4. Process for preparing polymers which comprises irradiating, with light of wavelength in the range of 1800 to 7000 Angstroms, a composition comprising a member of the class consisting of photopolymerizable vinyl and vinylidene compounds, from 0.01 to 1.0% by weight thereof, of an aromatic acyloin of the formula

R—CO—CHOH—R' wherein R and R' are monovalent hydrocarbon radicals, and a peroxide, the radiation being of sufficient intensity and employed for a time sufficient to produce substantial polymerization.

5. Process for preparing polymers which comprises irradiating, with light of wavelength in the range from 1800 to 7000 Angstroms, a composition comprising an alkyl ester of a monocarboxylic acid RCOOH, wherein R is an acyclic hydrocarbon radical of 2 to 3 carbon atoms having a double bond between the carbon attached to the carboxyl and a carbon once removed from the carboxyl, and from 0.01 to 1.0% of an acyloin of the formula R—CO—CHOH—R', wherein R and R' are monovalent hydrocarbon radicals, the radiation being of sufficient intensity and employed for a time sufficient to produce substantial polymerization.

6. Process for preparing polymers which comprises irradiating, with light of wavelength in the range of 1800 to 7000 Angstroms, a composition comprising a lower alkyl ester of a monocarboxylic acid of the class consisting of acrylic and methacrylic acids and from 0.01 to 1.0%, by weight thereof, of an aromatic acyloin of the formula R—CO—CHOH—R', wherein R and R' are monovalent hydrocarbon radicals, the radiation being of sufficient intensity and employed for a time sufficient to produce substantial polymerization.

7. Process for preparing polymers which comprises irradiating, with light of wavelength in the range of 1800 to 7000 Angstroms, a composition comprising a member of the class consisting of photopolymerizable vinyl and vinylidene compounds, and from 0.01 to 1.0%, by weight thereof, of benzoin, the radiation being of sufficient intensity and employed for a time sufficient to produce substantial polymerization.

8. Process for preparing polymers which comprises irradiating, with light of wavelength in the range of 1800 to 7000 Angstroms, a composition comprising a member of the class consisting of photopolymerizable vinyl and vinylidene compounds, from 0.01 to 1.0% by weight thereof, of benzoin, and a peroxide, the radiation being of sufficient intensity and employed for a time sufficient to produce substantial polymerization.

9. Process for preparing polymers which comprises irradiating, with light of wavelength in the range of 1800 to 7000 Angstroms, a composition comprising a member of the class consisting of photopolymerizable vinyl and vinylidene compounds, and from 0.01 to 1.0%, by weight thereof, of an aliphatic acyloin of the formula

R—CO—CHOH—R' wherein R and R' are monovalent hydrocarbon radicals, the radiation being of sufficient intensity and employed for a time sufficient to produce substantial polymerization.

10. Process for preparing polymers which comprises irradiating, with light of wavelength in the range of 1800 to 7000 Angstroms, a composition comprising a member of the class consisting of photopolymerizable vinyl and vinylidene compounds, from 0.01 to 1.0% by weight thereof, of an aliphatic acyloin of the formula

R—CO—CHOH—R' wherein R and R' are monovalent hydrocarbon radicals, and a peroxide, the radiation being of sufficient intensity and employed for a time sufficient to produce substantial polymerization.

11. Process for preparing polymers which comprises irradiating, with light of wavelength in the range of 1800 to 7000 Angstroms, a composition comprising a lower alkyl methacrylate and from 0.01 to 1.0%, by weight thereof, of an acyloin of the formula R—CO—CHOH—R', wherein R and R' are monovalent hydrocarbon radicals, the radiation being of sufficient intensity and employed for a time sufficient to produce substantial polymerization.

12. Process for preparing polymers which comprises irradiating, with light of wavelength in the range of 1800 to 7000 Angstroms, a composition comprising a lower alkyl methacrylate and from 0.01 to 1.0%, by weight thereof, of an aromatic acyloin of the formula R—CO—CHOH—R', wherein R and R' are monovalent hydrocarbon radicals, the radiation being of sufficient intensity and employed for a time sufficient to produce substantial polymerization.

13. Process for preparing polymers which comprises irradiating, with light of wavelength in the range of 1800 to 7000 Angstroms a composition comprising a lower alkyl methacrylate and from 0.01 to 1.0%, by weight thereof, of benzoin, the radiation being of sufficient intensity and employed for a time sufficient to produce substantial polymerization.

14. Process for preparing polymers which comprises irradiating, with light of wavelength in the range of 1800 to 7000 Angstroms, a composition comprising methyl methacrylate, benzoyl peroxide, and from 0.01 to 1.0%, based on the methyl methacrylate, of benzoin, the radiation being of sufficient intensity and employed for a time sufficient to produce substantial polymerization.

15. Process for preparing polymers which comprises irradiating, with the light generated by a mercury vapor lamp having wavelengths in the range of 3200 to 7000 Angstroms, a composition comprising an ethylenically unsaturated, organic compound photopolymerizable at least in the presence of another such compound and an alpha carbonyl alcohol of the formula

R—CO—CHOH—R' wherein R and R' are monovalent hydrocarbon radicals, the radiation being of sufficient intensity and employed for a time sufficient to produce substantial polymerization.

16. Process for preparing polymers which comprises irradiating, with the light generated by a mercury vapor lamp having wavelengths in the range of 3200 to 7000 Angstroms, a composition comprising methyl methacrylate, benzoyl peroxide, and from 0.01 to 1.0%, based on the methyl methacrylate, of benzoin, the radiation being of sufficient intensity and employed for a time sufficient to produce substantial polymerization.

17. Process for preparing polymers which comprises irradiating, with light of wavelength in the range of 1800 to 7000 Angstroms, a composition comprising a lower alkyl ester of a monocarboxylic acid of the class consisting of acrylic and methacrylic acids and from 0.01 to 1.0%, by weight thereof, of acetoin, the radiation being of sufficient intensity and employed for a time sufficient to produce substantial polymerization.

18. Process for preparing polymers which comprises irradiating, with light of wavelength in the range of 1800 to 7000 Angstroms, a composition comprising methyl methacrylate and from 0.01 to 1.0% based on the methyl methacrylate of acetoin, the radiation being of sufficient intensity and employed for a time sufficient to produce substantial polymerization.

19. Process for preparing polymers which comprises irradiating, with light of wavelength in the range of 1800 to 7000 Angstroms, a composition comprising a vinyl ester and from 0.01 to 1.0%, by weight thereof, of benzoin, the radiation being of sufficient intensity and employed for a time sufficient to produce substantial polymerization.

20. Process for preparing polymers which comprises irradiating, with light of wavelength in the range of 1800 to 7000 Angstroms, a composition comprising vinyl acetate and from 0.01 to 1.0%, by weight thereof, of benzoin, the radiation being of sufficient intensity and employed for a time sufficient to produce substantial polymerization.

COURTLAND L. AGRE.